C. A. MYERS.
DEMOUNTABLE VEHICLE RIM.
APPLICATION FILED MAY 31, 1912.
1,109,173.
Patented Sept. 1, 1914.
2 SHEETS—SHEET 1.
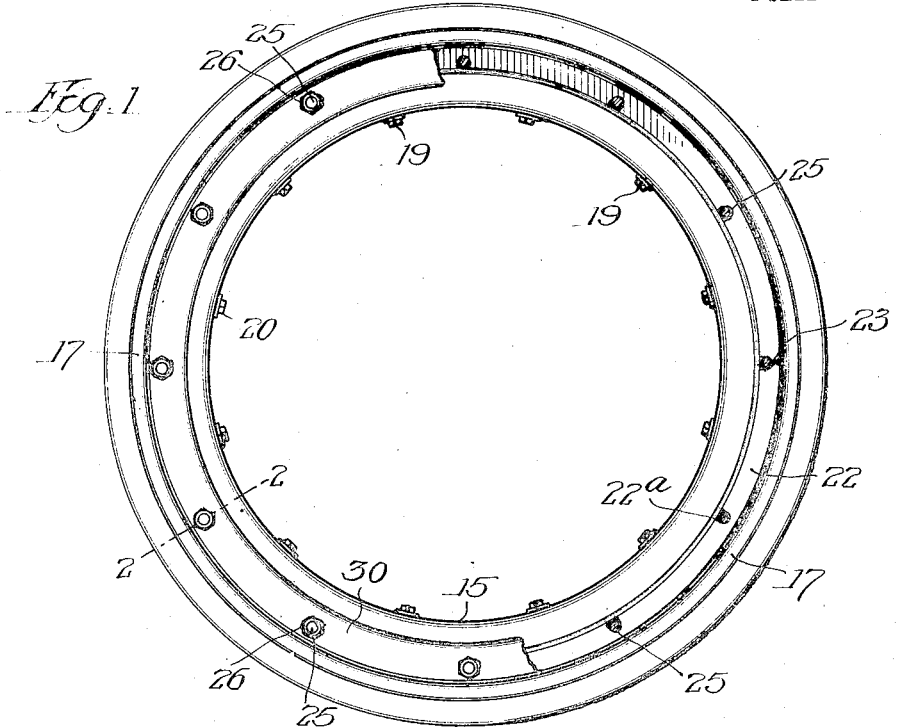
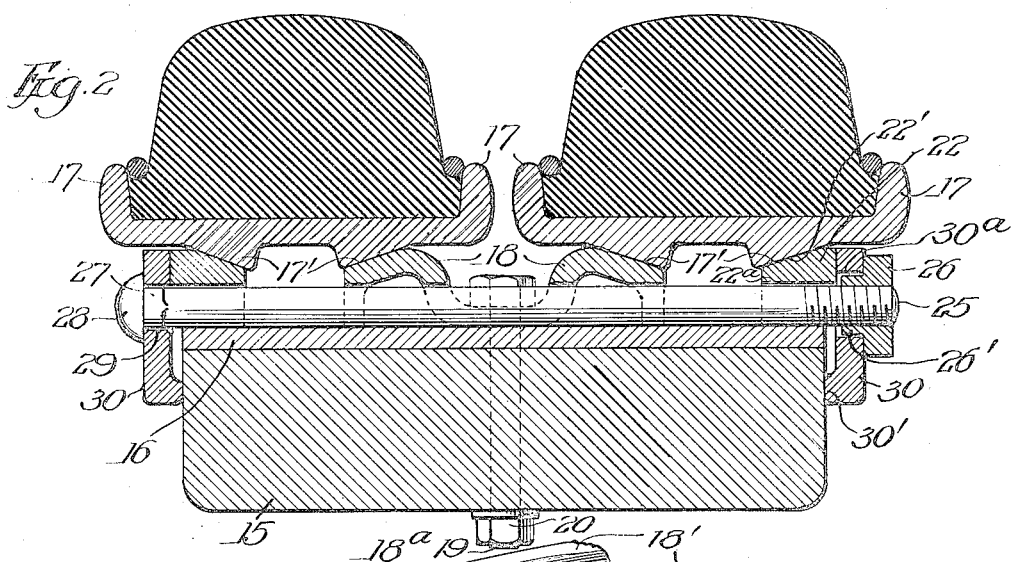

C. A. MYERS.
DEMOUNTABLE VEHICLE RIM.
APPLICATION FILED MAY 31, 1912.
1,109,173.
Patented Sept. 1, 1914.
2 SHEETS—SHEET 2.
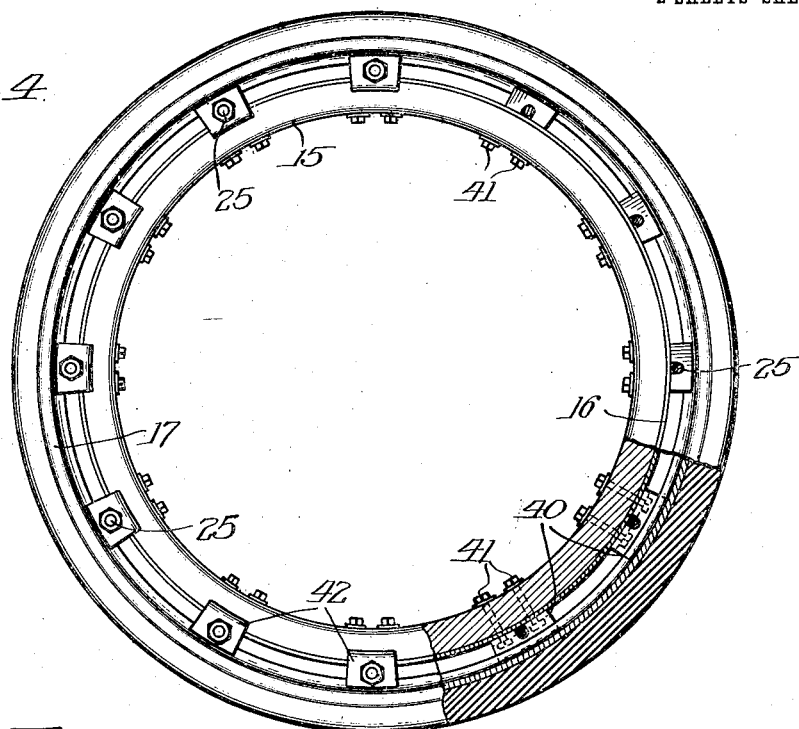
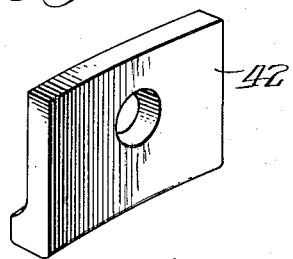
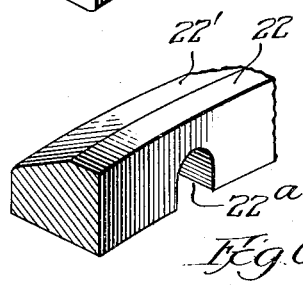
Witnesses:
Inventor
Carmon A. Myers

UNITED STATES PATENT OFFICE.

CARMON A. MYERS, OF AKRON, OHIO, ASSIGNOR TO THE FIRESTONE TIRE & RUBBER COMPANY, OF AKRON, OHIO, A CORPORATION OF OHIO.

DEMOUNTABLE VEHICLE-RIM.

1,109,173.           Specification of Letters Patent.       Patented Sept. 1, 1914.

Application filed May 31, 1912. Serial No. 700,694.

*To all whom it may concern:*

Be it known that I, CARMON A. MYERS, a citizen of the United States, residing at Akron, in the county of Summit and State of Ohio, have invented certain new and useful Improvements in Demountable Vehicle-Rims, as set forth in the following specification.

My invention relates to demountable rims for automobile tires and the like, and has more particular reference to the clamping means by which such rims are held in position on the wheel felly.

Hitherto in constructions of the general character herein illustrated and described the transverse bolts holding the tire rim upon the wheel have passed through the felly, thus weakening that member, and also producing a construction in which the pull of the bolt is limited by its close association with the fulcruming line or bearing edge of the clamping member.

In view of these disadvantages the principal objects of the present invention are to produce a strong, durable and simple construction in which the pull of the bolt is made more directly upon the side clamping member near its line of contact with the wedging member, thus giving the bolt greater holding power without sacrificing any of the advantages of this type of rim construction; and a further object is to avoid boring through the wheel felly at intervals therein, especially in the single tire form where the felly is comparatively small.

A still further object is to provide means and arrangements of parts whereby the shocks of contact of the side of the wheel with curbing or other hard objects may be transmitted directly to the wheel and not come upon the locking bolts and nuts to their injury as has been heretofore the case.

Other objects will appear hereinafter.

In the drawings accompanying this specification and forming a part thereof there is illustrated a preferred embodiment of these improvements for double and single tire construction.

Figure 1 is a side elevation of a wheel felly carrying double tire construction, part of the clamping flange or side ring being broken away; Fig. 2 is a cross section through one of the transverse bolts, as on the line 2—2 of Fig. 1; Fig. 3 is a fragmentary perspective of the center band recessed for the accommodation of a cross bolt; Fig. 4 is a similar view to that of Fig. 1, but showing modified forms of the several holding elements; Fig. 5 is a perspective of one of the clamping blocks shown in Fig. 4; and Fig. 6 is a perspective view of a fragment of the split wedging ring preferably used.

In these drawings 15 indicates the wheel felly, 16 the felly band and 17 the tire rim. As illustrated, the tire rims are preferably formed with wedging surfaces 17'.

Referring more particularly to the double tire construction for the immediately next ensuing description, the center ring 18 comprises a metallic band rolled into substantially the shape shown in Fig. 3, having a central base portion and edges adapted to rest upon the felly band and provided with beveled surfaces 18' adapted to co-act with the similar surfaces on the tire rim in holding the latter in position upon the wheel. The center ring 18 is transversely recessed at intervals for the accommodation of locking bolts 25, and this ring 18 is rigidly secured to the felly band by a plurality of bolts 19 passing through the center ring, felly band and felly, these bolts being provided with nuts 20. The wedging ring 22 has similar recesses 22ª to accommodate the bolts 25, and is provided with a beveled surface 22' adapted to contact a similar surface 17' on the tire rim. This wedging ring 22 is split, as at 23, to permit its expansion or contraction when it is being forced into tight relation with the tire rim. The side ring or flange 30 is formed with a plurality of bolt apertures 30ª in alinement with the recesses 18ª and 22ª of the center ring and wedging ring respectively. The inner circumferential portion of the ring 30 has a projecting flange or annular extension 30' formed to abut the wheel felly and act as a fulcrum against the power transmitted by the nut 26. The outer circumferential portion of this ring 30 bears against the wedging ring 22, forcing it into clamping contact with the tire rim when the nut is tightened.

It will be noted from the drawings that the flanges of the tire rims 17 project beyond the planes of the sides of the wheel felly and of the nut 26. By this arrangement the shocks of contact of the side of the wheel with such hard obstacles as a sidewalk curb are received by the heavy tire rim and transmitted therefrom directly to the wheel, and the bolt-heads and nuts are thus protected from the shearing and bending to which heretofore they have been subjected. But in order that this extension of the tire rim flange may not be excessive, the present invention includes a special formation of nut having a cylindrical reduced portion 26' formed to extend within the body of the side ring 30 through the aperture 30ª, which is slightly greater in diameter than the portion 26', to permit the side ring freely to move inwardly at the top, if it so happens that such movement takes place when the nut is being tightened. This arrangement and construction thus provide a large amount of holding power with a minimum of extension of the nut beyond the outer surface of the side ring 30. Another function of this reduced portion is that should any shocks be received by the nut they will be transmitted directly to the side clamping member, and the bolt thus prevented from being bent.

It will now be seen that when the tire rims are in position upon the center ring or abutment member 18, the wedging rings 22 applied, and the nut 26 tightened upon the side rings 30, the pull of the bolt will be exerted with great force directly upon the wedging ring owing to its near association therewith, the fulcrum for the lever-like action of the side ring being at a relatively considerable distance from the source of power. Thus the tire may be held securely without undue straining and wrenching of the clamping means, and without the incidental wear and ruination of the bolt and nut threads as has been heretofore the case.

In the modified form of holding means shown in Figs. 4 and 5 the center ring is dispensed with, and blocks 40 formed from sections of such a ring are secured by means of bolts 41 upon the felly band. These blocks are recessed for the accommodation of the bolt 25 as in the first described form. It has been found preferable to use a split wedging ring also in this construction, although sections of such a ring could be used for the purpose. Instead of a continuous side ring or flange, this modification includes blocks 42, which, as shown in Fig. 5, consist merely of sections of the ring hereinabove described. Each of these blocks is apertured to receive the bolt 25. The holding of the tire rim is accomplished in the same manner as that already herein set forth, and will be fully understood without repetition. In order that the bolt 25 may not turn while it is being tightened or loosened, a square shank 27 may be provided near the head 28, accommodated in a square aperture 29 on one of the side rings.

It will be evident to those skilled in the art that various changes may be made in the specific forms of tire holding means herein illustrated and described without departing from the spirit or scope of this invention.

I claim:—

1. In a demountable rim construction of the character described, the combination of a pair of tire rims, a felly having a band thereon, a center ring on said felly band between said rims, said center ring having a pair of oppositely disposed abutment surfaces, a pair of wedging rings engaging said tire rims on their outer sides, a pair of side rings, each of which engages one of said wedging rings and said felly, a plurality of bolts passing through both of said side rings, and nuts for said bolts whereby, on tightening said nuts, said tire rims will be simultaneously drawn toward each other and against the abutment surfaces of said center ring, thereby securing said tire rims in position, substantially as described.

2. In a demountable rim construction of the character described, the combination of a pair of tire rims, a felly having a band thereon, a center ring on said felly band between said rims, said center ring having a pair of oppositely and obliquely disposed abutment surfaces, means for fastening said center ring to said felly band, a pair of wedging rings engaging said tire rims on their outer sides, a pair of side rings, each of which engages one of said wedging rings and said felly, a plurality of bolts passing through both of said side rings, said wedging rings and said center ring, and nuts for said bolts, whereby, on tightening said nuts, said tire rims will be simultaneously drawn toward each other and against the obliquely disposed surfaces of said center ring, thereby securing said tire rims in position, substantially as described.

CARMON A. MYERS.

Witnesses:
R. E. GLASS,
S. G. CARKHUFF.